(12) United States Patent
Moorland

(10) Patent No.: US 12,084,091 B2
(45) Date of Patent: Sep. 10, 2024

(54) AERIAL ROPEWAY HAZARD SENSING SYSTEM AND METHOD

(71) Applicant: Leitner-Poma of America, Inc., Grand Junction, CO (US)

(72) Inventor: Matthew Moorland, Grand Junction, CO (US)

(73) Assignee: Leitner-Poma of America, Inc., Grand Junction, CO (US)

( * ) Notice: Subject to any disclaimer, the term of this patent is extended or adjusted under 35 U.S.C. 154(b) by 860 days.

(21) Appl. No.: 17/157,254

(22) Filed: Jan. 25, 2021

(65) Prior Publication Data

US 2021/0229713 A1     Jul. 29, 2021

Related U.S. Application Data

(60) Provisional application No. 62/966,301, filed on Jan. 27, 2020.

(51) Int. Cl.
*B61B 12/06*     (2006.01)
*B61B 7/00*     (2006.01)
(Continued)

(52) U.S. Cl.
CPC ................ *B61B 12/06* (2013.01); *B61B 7/00* (2013.01); *B61B 7/04* (2013.01); *B61B 11/00* (2013.01); *G01S 13/88* (2013.01); *G01S 13/886* (2013.01)

(58) Field of Classification Search
CPC ...... B61L 1/00; B61L 3/00; B61L 3/02; B61L 23/00; B61B 7/00; B61B 7/04;
(Continued)

(56) References Cited

U.S. PATENT DOCUMENTS

| 3,348,499 A | 10/1967 | Sowder |
| 5,528,219 A | 6/1996 | Frohlich et al. |
(Continued)

FOREIGN PATENT DOCUMENTS

| CH | 693330 A5 | 10/1998 |
| CH | 716205 A2 * | 11/2020 |
(Continued)

OTHER PUBLICATIONS

Notification of Transmittal of the International Search Report and the Written Opinion of the International Searching Authority, or the Declaration for PCT/US21/14997 Application dated Apr. 8, 2021, 1 page.

(Continued)

*Primary Examiner* — Zachary L Kuhfuss
*Assistant Examiner* — Heaven R Buffington
(74) *Attorney, Agent, or Firm* — William P. O'Meara; Cochran Freund & Young LLC

(57) ABSTRACT

An aerial ropeway hazard sensing system including a radar sensing unit mounted at a position along a ropeway that generates radar data representative of predetermined ropeway conditions proximate the radar sensing unit, and a processor that analyzes data from the radar sensing unit to detect predetermined hazard conditions and to generate a hazard detection signal indicative thereof. A method of performing an aerial ropeway safety function comprises using radar to detect a hazard condition and generating a hazard detection signal in response thereto; generating a control signal in response to the hazard detection signal; and initiating a safety with the control signal.

6 Claims, 4 Drawing Sheets

(51) Int. Cl.
*B61B 7/04* (2006.01)
*B61B 11/00* (2006.01)
*G01S 13/88* (2006.01)

(58) Field of Classification Search
CPC ......... B61B 12/06; B61B 11/00; G01S 13/00; G01S 13/886; G08B 21/00; G08B 21/02; G08B 31/00
USPC .......................... 104/173.2, 173.1, 178, 179
See application file for complete search history.

(56) References Cited

U.S. PATENT DOCUMENTS

| | | | |
|---|---|---|---|
| 6,224,015 | B1 | 5/2001 | Reinhard |
| 7,114,451 | B2 * | 10/2006 | Albrich ................ B61B 12/002 104/173.1 |
| 2010/0018434 | A1 | 1/2010 | Moritzhuber et al. |

FOREIGN PATENT DOCUMENTS

| | | | | |
|---|---|---|---|---|
| CN | 112455503 | A * | 3/2021 | |
| DE | 102013003916 | A1 * | 9/2013 | ............. G01S 13/00 |
| FR | 2898321 | A1 * | 9/2007 | ............... B61B 1/02 |

OTHER PUBLICATIONS

International Search Report for PCT/US21/14997 Application dated Apr. 8, 2021, 2 pages.
Written Opinion of the International Searching Authority for PCT/US21/14997 Application dated Apr. 8, 2021, 6 pages.

* cited by examiner

AERIAL ROPEWAY HAZARD SENSING SYSTEM AND METHOD

This application claims priority from U.S. Provisional Application Ser. No. 62/966,301, filed Jan. 27, 2020, for Aerial Ropeway Sensing System and Method of Mathew Moorland, which is hereby incorporated by reference for all that it discloses.

BACKGROUND

In ski resorts, skiers and boarders are transported to the top of a ski trail by an aerial ropeway with attached carriers, such as lift chairs or gondolas. There are various hazards inherent to aerial ropeways, and aerial ropeways are therefore monitored by lift operators and/or sensing systems so that appropriate action may be taken when a hazard arises. For example, if a skier falls at a lift unloading station, the lift operator will stop the lift to allow the fallen skier to get up and move out of the way before the operator restarts the lift. The same sort of actions are sometimes performed automatically by sensing systems.

SUMMARY

An aerial ropeway radar hazard sensing system includes a radar sensing unit mounted at a position along a ropeway that generates radar data representative of predetermined ropeway conditions proximate the radar sensing unit and a processor that analyzes the radar data generated by the radar sensing unit to detect predetermined hazard conditions and to generate a hazard detection signal indicative thereof.

A method of performing an aerial ropeway safety function includes using radar to detect a hazard condition; generating a hazard detection signal in response to the detection of the hazard condition; generating a control signal in response to the hazard detection signal; and initiating a safety function with the control signal.

DETAILED DESCRIPTION

Definitions

Figure 1:
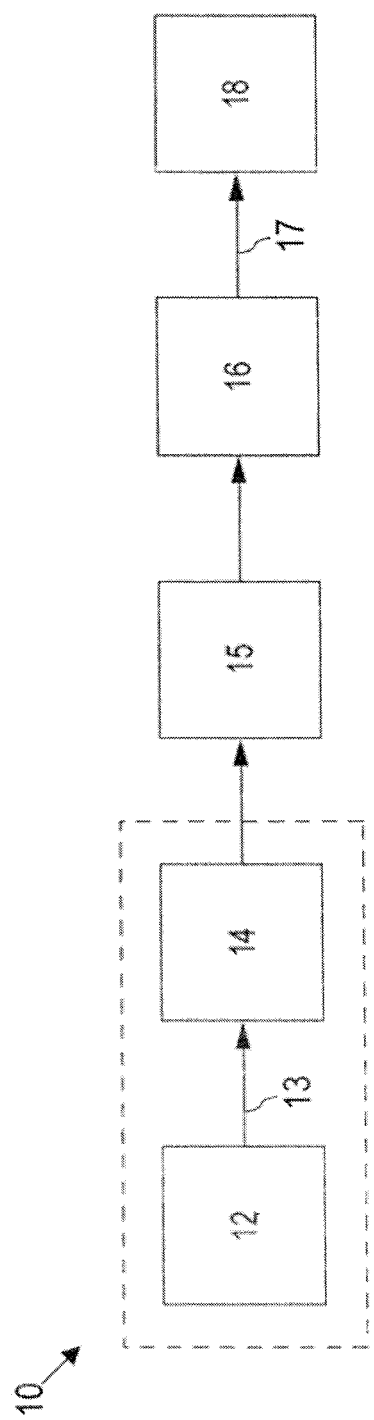
FIG. 1 is a block diagram of an example implementation of an aerial ropeway radar hazard sensing system.

"Carrier" refers to any chair, cabin, T-bar, or other support mounted on an aerial ropeway that carries people or equipment.

"Ropeway terminal" refers to any structure that contains machinery to drive an aerial ropeway as well as convey the carriers around corners.

"Aerial ropeway hazards" refers to a number of conditions or events associated with aerial ropeways that pose an elevated risk to people or equipment on or in the proximity of the aerial ropeway.

"Safety function" refers to any process that is used to reduce the risk associated with a subject aerial ropeway hazard.

Example Safety Functions

One example safety function involves carrier swing angle measurement. Carriers sometimes swing back and forth on an aerial ropeway, for example during high wind conditions. After a carrier leaves and/or before it enters a terminal, If the carrier swing angle is too great, a stop signal may be issued before the carrier enters or before it leaves the terminal.

Another example safety function involves passenger monitoring at remote installations where there are no lift attendants. Passengers or equipment are monitored to detect improper loading. A sensing signal indicative of improper loading is transmitted to a central controller that initiates a safety action, for example, stopping the lift or notifying the ski patrol.

Another example safety function involves carrier position monitoring in the terminal. If a carrier becomes detached from the ropeway, the detachment may be sensed so corrective action can be taken.

Another example safety function involves sensing when a passenger fails to unload from a carrier.

Another example safety function involves sensing the position of a passenger safety restraint at a loading or unloading position. For example, a pull down safety bar on a chair lift is adapted to be pulled down by passengers after loading to secure passengers on the chair and then raised by the passengers as the chair approaches the unloading station. However, the safety bar may be in a down position when the chair arrives at a lift station, preventing the current passengers from unloading. Similarly, a chair that has the safety bar in the down position when it arrives at the passenger loading area would prevent passengers from loading.

Another example safety function involves sensing a passenger falling during unloading, such that he/she is in danger of having other passengers run into or fall on top of him/her. When this condition is sensed the aerial ropeway would typically be stopped until the fallen passenger clears the space in front of oncoming passengers.

Aerial Ropeway Radar Hazard Sensing System Overview

In general, this specification discloses an aerial ropeway radar hazard sensing system. The sensing system includes a radar sensing unit mounted at a position along a ropeway that generates radar data representative of predetermined ropeway conditions proximate its location and a processor that analyzes data from the radar sensing unit to detect predetermined hazard conditions and generate a hazard detection signal indicative thereof.

It is applicant's observation that, although some of the above described example safety functions may have been performed by others with light sensors, such light sensor systems are subject to malfunction during harsh conditions in which snow or rain interfere with operation of the light sensors. Applicant has discovered that reliable performance of safety functions associated with aerial ropeways can be achieved, even during harsh weather, with a radar based sensing system Some implementations of applicant's radar based sensing system can be used to identify target objects along the aerial ropeway and provide very accurate measurements of distance, velocity and angular orientation of the target objects. One example of the radar sensing system generates "point clouds" similar to light imaging systems. However, applicant's aerial ropeway radar hazard sensing system also provides accurate distances of the sensed objects from the radar unit using a single radar unit rather than with artificial intelligence that requires extensive training and testing in order to determine distance. Many safety functions require the distance, velocity, or angle of the target. The point cloud generated by applicant's system explicitly detects and indicates the distance, velocity, and angle of the target of the safety function, such as a ski lift carrier/chair. Object recognition may be performed using computer vision algorithms, such as used in industrial manufacturing and quality control, to further refine the detection of the target. Thus, implementations of applicant's aerial ropeway radar hazard sensing system can identify a target object, determine the object's distance from the radar unit, the object's linear and angular speed and acceleration and its orientation relative adjacent objects with a single sensing unit, even in inclement weather.

FIG. 1 is a schematic drawing of an example aerial ropeway radar hazard sensing system 10. The sensing system 10 includes a radar antenna and processing unit 12, the antenna of which transmits a radar signal that is reflected from a target object to the processing unit. The reflected radar signal is processed to provide a data point-cloud signal 13 indicative, for example, of the distance of the target object from the radar antenna and processing unit 12, and time derivatives of linear and angular displacement of the target object. In one embodiment the radar antenna and processing system may be a Texas instruments mmWave 60-Ghz integrated single chip sensor. The sensing system 10 may include a separate processor 14 that analyzes the point cloud signal 13 generated by the radar antenna and processing system 12. The processor 14 compares the data generated by the antenna and processing system 12 to predetermined data indicative of a normal operating state of the aerial ropeway for the relevant safety function. Processing unit 14 may communicate with the radar antenna and processing system 12, as through a universal asynchronous receiver/transmitter ("UART") (not shown). The processing unit 14 transmits the results of its safety function comparison, as through an interface 15 such as a network communication system, e.g., Ethernet, to a programmable logic controller ("PLC") 16 that then sends appropriate commands 17 to relevant equipment 18 to perform the required action, e.g., sending commands to a chairlift drive motor to stop the chair lift.

Figure 2:
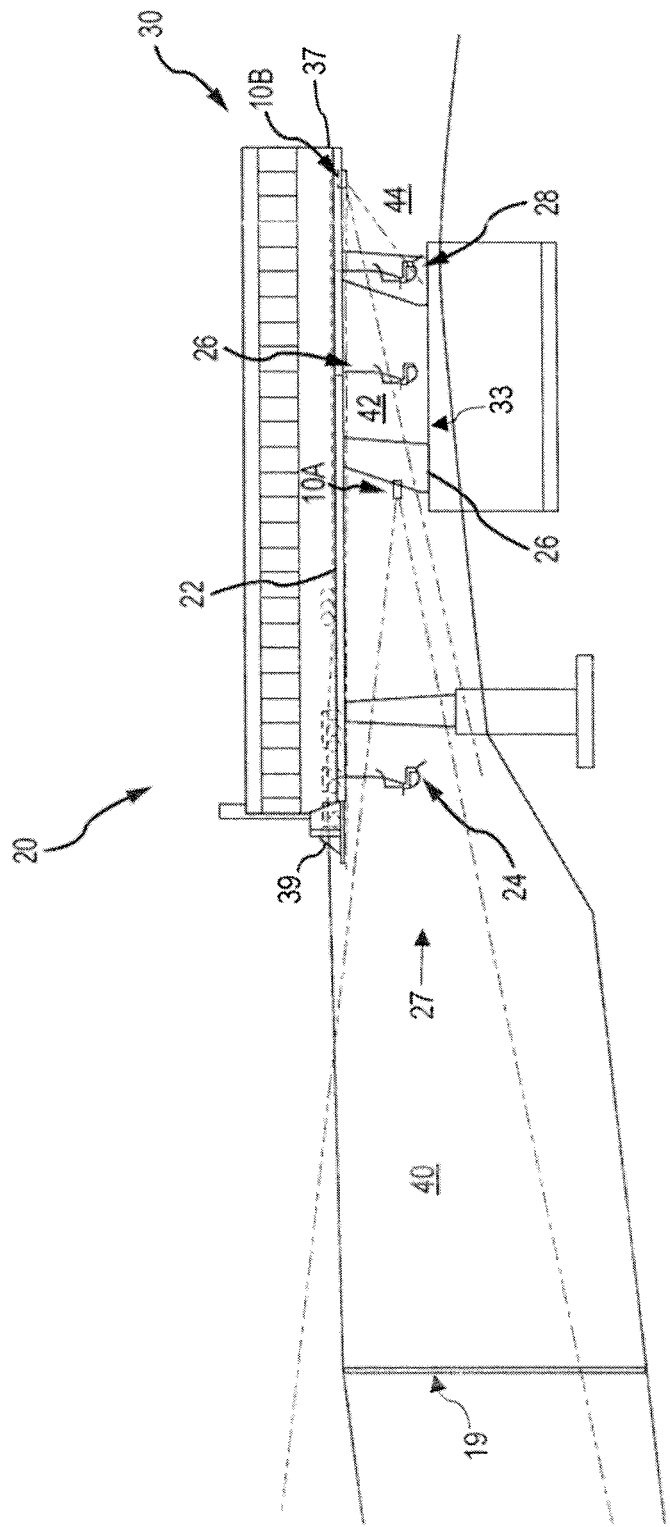
FIG. 2 is a side elevation view of an aerial ropeway radar hazard sensing system having multiple radar sensing units installed proximate a ski lift loading/unloading station.
Figure 3:
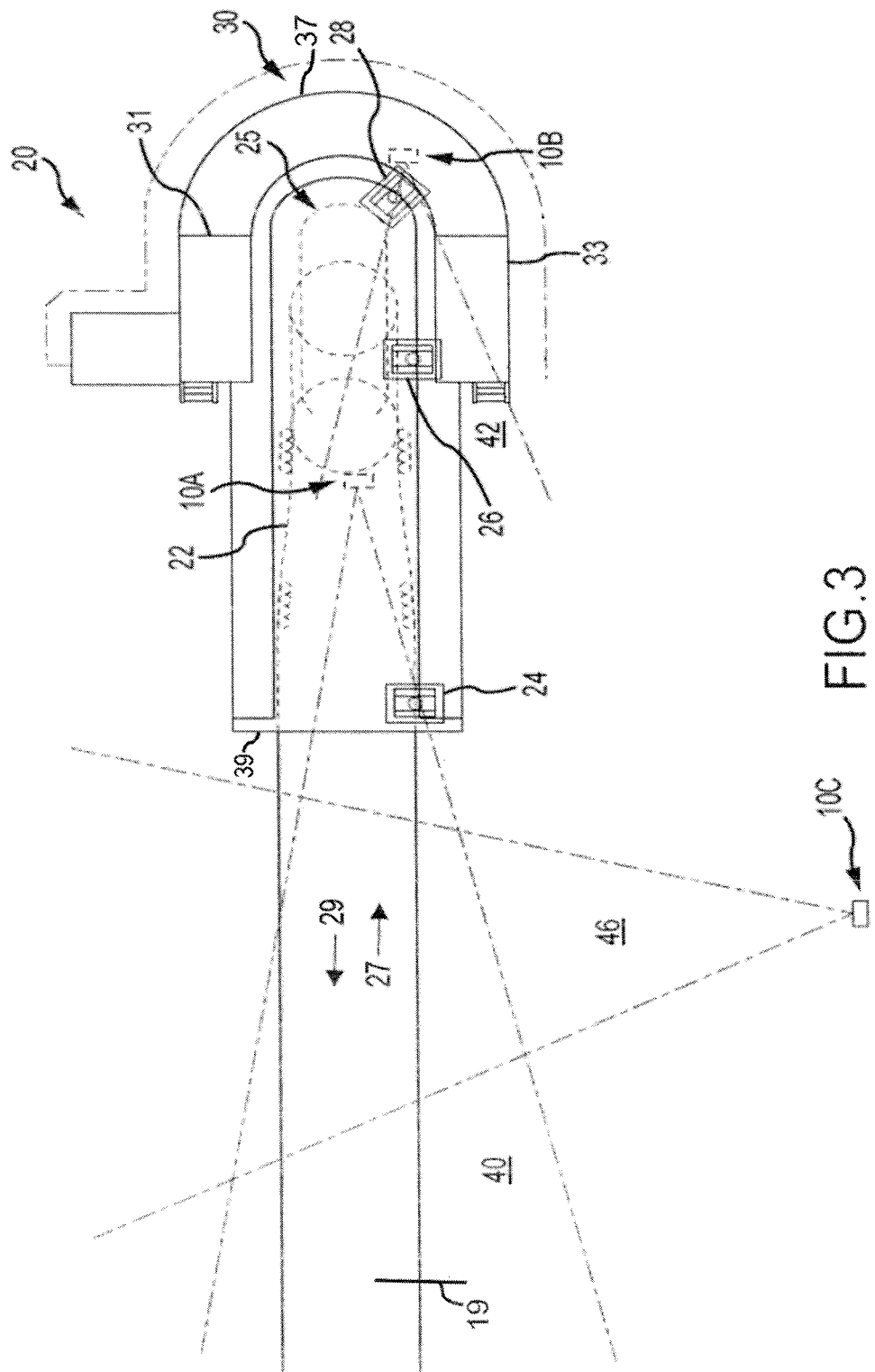
FIG. 3 is a top plan view of the aerial ropeway radar hazard sensing system of FIG. 2.

FIG. 2 is a side elevation view and FIG. 3 is a top plan view of an example of an aerial ropeway 20 with multiple radar hazard sensing units 10A and 10B installed proximate the ropeway 20 and a lift loading and unloading station 30, which has a loading ramp 31, FIG. 3, and an unloading ramp 33. The aerial ropeway 20 includes a continuous cable 22 and also includes a cable wheel assembly 25 that causes displacement of the cable 22 and chairs 24, 26, 28, etc. attached to the cable 22. The cable 22 is supported by cable support towers 19 (only one shown) that are positioned along the ropeway forward of the loading/unloading station 30. The chairs 24, 26, 28 enter the loading/unloading station 30 moving in an inward/rearward direction 27 and leave it moving in an outward/forward direction 29. The chairs 24, 26, 28, etc., are shown located proximate the positions where the chairs enter and leave an area over the lift unloading ramp 33. The loading/unloading station 30 has a inward/back end 37 positioned away from the ski slope and a outward/forward end 39 positioned nearer the ski slope, FIGS. 2 and 3.

FIG. 3 shows the aerial ropeway 20 and multiple radar hazard sensing units 10A and 10B and 10C of radar hazard sensing system 10 located along the aerial ropeway 20.

As further shown by FIGS. 2 and 3, radar sensing units 10A and 10B are mounted on structure near the loading/unloading station 30. A radar beam 40 from the first sensing unit 10A covers a region where chair 24 is currently located and may sense both the velocity and swinging displacement of chair 24 as it approaches the unloading ramp 33. Sensing unit 10B is located on other structure, which may be above unit 10A and near the inward/back end 37 of station 30, and generates a sensing unit 10B first radar beam 42 that may overlap with a portion of sensing unit 10A radar beam 40. A second radar beam 44 is also generated by radar sensing unit 10B and may be directed generally downwardly to sense, for example, a skier who has fallen while unloading from chair 28. As shown by FIG. 3, a third radar sensing unit 10C, which may be positioned forwardly of the loading/unloading station 30 and rearwardly of the first cable support tower 15, generates a radar beam 46 that extends in a direction generally transverse to radar beam 40 and may overlap therewith. Radar beam 46 may be used to detect excessive swing in a carrier/chair before it enters or after it leaves the loading/unloading station 30.

Figure 4:
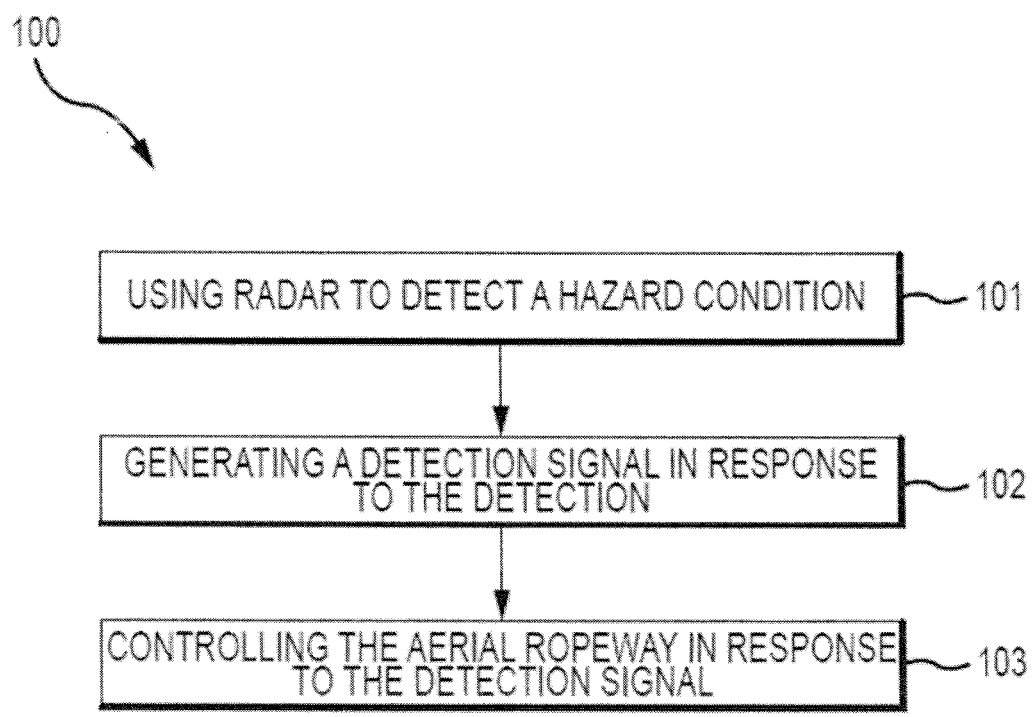
FIG. 4 is a flow chart of an example method of sensing a hazard associated with an aerial ropeway.

FIG. 4 is a flow chart of an example method 100 of sensing a hazard associated with an aerial ropeway. The method comprises the step 101 of using radar to detect a hazard condition; the step 102 of generating a detection signal in response to the detection; and step 103 of controlling the aerial ropeway in response to the detection signal.

Example commercially available components for use with radar system 10 may include: For a close-range antenna (0-10 m) such as sensing system 10B, TEXAS INSTRUMENTS™ IWR6843ISK-ODS™ close-range antenna may be used. For a long-range antenna, such as would be used with sensing system 10A, TEXAS INSTRUMENTS™ IWR6843ISK™ long-range antenna may be used.

Example common components of both radar sensing units 10A and 10B may include those listed below.

A TEXAS INSTRUMENTS™ MMWAVEICBOOST™ processor for processing the raw data of the radar module and formatting it into a point-cloud. This component of the system also contains circuitry to transmit the processed data to another source, such as the micro-computer described immediately below.

A BEAGLEBOARD™ BEAGLEBONE BLACK™ microcomputer (or any microcomputer) may be used for defining the desired safety function and processing the point-cloud data. This microcomputer also has predetermined parameters that will command appropriate action from the aerial ropeway controller, such as by issuing a slow or stop or signal.

A Micro USB cable may be used for connecting the micro-computer to the MMWAVEBOOST™ processor.

A 5 v 3-amp power supply may be used for powering the entire system.

An industrial network switch, MOXA EDS-608A-T. It may be used for transmitting command and diagnostic signals to the serial ropeway logic controller.

Certain embodiments of a radar based aerial ropeway hazard sensing system and associated methods of sensing aerial ropeway hazards are expressly described herein. Alternative embodiments of radar based aerial ropeway hazard sensing system and associated methods of sensing aerial ropeway hazards will become obvious to those of ordinary skill in the art after reading this disclosure. It is intended that the language of the appended claims be broadly construed to cover such alternative embodiments, except as limited by the prior art.

What is claimed is:

1. An aerial ropeway hazard sensing system comprising:
a plurality of radar sensing units mounted along an aerial ropeway having a ropeway cable that moves through a loading/unloading station and then in a forward direction toward a first cable support tower;
wherein the loading/unloading station has a loading ramp and an unloading ramp positioned on opposite lateral sides of the loading/unloading station at a forward end of the loading/unloading station;
wherein each radar sensing unit generates radar data representative of ropeway conditions proximate its location; and
at least one processor that analyzes data from the radar sensing units to detect predetermined hazard conditions and generate hazard detection signals indicative thereof;
wherein a first radar sensing unit transmits a first sensing unit radar beam in the forward direction that senses carriers positioned forward of the loading/unloading station and that is used to determine both velocity and swinging displacement of a carrier mounted on the ropeway cable as the carrier approaches but while the carrier is still a distance from the unloading ramp of the loading/unloading station;
wherein a second radar sensing unit positioned above and proximate a rear end portion of the unloading ramp transmits a second sensing unit first radar beam in the forward direction that senses carriers positioned over the unloading ramp and that overlaps with the first sensing unit radar beam, and the second radar sensing unit also transmits a second sensing unit second radar beam in a downward direction that senses at least a portion of the unloading ramp and that is used to detect a skier fallen from a carrier.

2. The aerial ropeway hazard sensing system of claim 1 wherein the plurality of radar sensing units further comprises: a third radar sensing unit mounted along the aerial ropeway forward of the loading/unloading station and
wherein the third radar sensing unit transmits a third sensing unit radar beam that extends transversely to and overlaps with the first sensing unit radar beam, the third sensing unit radar beam sensing carriers positioned forward of the loading/unloading station and being used to detect excessive swing in a carrier before the carrier enters or after the carrier leaves the loading/unloading station.

3. The hazard sensing system of claim 2, further comprising a controller that receives the hazard detection signal from the at least one processor and generates a control signal for controlling predetermined aerial ropeway equipment in response to the hazard detection signal.

4. The hazard sensing system of claim 3 wherein the control signal causes the ropeway cable to stop.

5. The hazard sensing system of claim 3 wherein the control signal causes the ropeway cable to reduce speed.

6. The hazard sensing system of claim 3, wherein the predetermined hazard conditions detected are:
a carrier detached from the aerial ropeway;
a passenger failing to unload from a carrier;
an improper position of a passenger safety restraint and
a passenger fallen from a carrier.

* * * * *